(12) United States Patent
Cardinal et al.

(10) Patent No.: US 7,051,827 B1
(45) Date of Patent: May 30, 2006

(54) CRUISE CONTROL SAFETY DISENGAGEMENT SYSTEM

(76) Inventors: Thomas W Cardinal, 4600 - 311th St., Stacy, MN (US) 55079; John C Thiry, 23700 Lyons St. NE, Stacy, MN (US) 55079; Daniel K Westlund, 4645 - 311th St., Stacy, MN (US) 55079

( * ) Notice: Subject to any disclaimer, the term of this patent is extended or adjusted under 35 U.S.C. 154(b) by 620 days.

(21) Appl. No.: 09/804,769

(22) Filed: Mar. 13, 2001

(51) Int. Cl.
*B60T 8/58* (2006.01)

(52) U.S. Cl. ............... 180/174; 180/178; 701/93; 701/97

(58) Field of Classification Search .............. 180/170, 180/172, 174, 178, 179, 271, 282; 701/93, 701/97
See application file for complete search history.

(56) References Cited

U.S. PATENT DOCUMENTS

| | | | |
|---|---|---|---|
| 4,023,864 A | 5/1977 | Lang et al. ............ 303/20 |
| 4,030,066 A | 6/1977 | White .................. 340/73 |
| 4,213,116 A | 7/1980 | Holtzman et al. ...... 340/73 |
| 4,522,280 A | 6/1985 | Blaney ............... 180/175 |
| 4,803,627 A | 2/1989 | Yasuike et al. ..... 364/424.05 |
| 4,890,231 A | 12/1989 | Frantz ............. 364/426.04 |
| 4,908,767 A | 3/1990 | Scholl et al. ......... 364/453 |
| 5,063,782 A | 11/1991 | Kellett ................ 73/654 |
| 5,087,068 A | 2/1992 | Fukanaga et al. ...... 280/707 |
| 5,123,497 A | 6/1992 | Yopp et al. ........... 180/142 |
| 5,212,640 A | 5/1993 | Matsuda ........... 364/424.03 |
| 5,247,466 A | 9/1993 | Shimada et al. ........ 364/566 |
| 5,269,187 A | 12/1993 | Hanson ............... 73/495 |
| 5,276,624 A | 1/1994 | Ito et al. .......... 364/424.05 |
| 5,369,580 A | 11/1994 | Monji et al. ....... 364/424.01 |
| 5,473,930 A | 12/1995 | Gademann et al. ...... 73/1 D |
| 5,548,273 A | 8/1996 | Nicol et al. .......... 340/439 |
| 5,627,756 A | 5/1997 | Fukada et al. ..... 364/426.01 |
| 5,629,851 A * | 5/1997 | Williams et al. ... 364/426.044 |
| 5,732,377 A | 3/1998 | Eckert ................ 701/426 |
| 5,742,918 A | 4/1998 | Ashrafi et al. ......... 701/70 |
| 5,742,919 A | 4/1998 | Ashrafi et al. ......... 701/70 |
| 5,878,357 A | 3/1999 | Sivashankar et al. ..... 701/1 |
| 5,900,819 A | 5/1999 | Kyrtsos .............. 340/576 |
| 5,931,546 A | 8/1999 | Nakashima et al. ..... 303/146 |
| 6,002,975 A | 12/1999 | Schiffmann et al. ..... 701/36 |
| 6,009,368 A | 12/1999 | Labuhn et al. ......... 701/96 |
| 6,092,617 A | 7/2000 | White, III et al. ...... 180/338 |
| 6,130,608 A | 10/2000 | McKeown et al. ...... 340/438 |
| 6,185,485 B1 | 2/2001 | Ashrafi et al. .......... 701/1 |
| 6,253,141 B1 * | 6/2001 | McCann .............. 701/71 |
| 6,301,542 B1 * | 10/2001 | Kirchberger et al. ..... 701/93 |
| 6,313,749 B1 * | 11/2001 | Horne et al. ......... 340/575 |
| 6,317,679 B1 * | 11/2001 | Sielagoski et al. ...... 701/96 |
| 6,370,469 B1 * | 4/2002 | Phung et al. .......... 701/93 |
| 6,374,173 B1 * | 4/2002 | Ehlbeck .............. 701/93 |
| 6,433,681 B1 * | 8/2002 | Foo et al. ............ 340/440 |

* cited by examiner

*Primary Examiner*—Jeff Restifo
(74) *Attorney, Agent, or Firm*—Sherrill Law Offices, PLLC

(57) ABSTRACT

A cruise control swerve release system effective for automatically disengaging a cruise control system when a vehicle experiences a lateral acceleration indicative of a loss or impending loss of driver control.

17 Claims, 6 Drawing Sheets

CRUISE CONTROL SAFETY DISENGAGEMENT SYSTEM

FIELD OF INVENTION

The invention generally relates to safety devices for motorized vehicles. The invention also generally relates to cruise control systems for motorized vehicles.

BACKGROUND

Motorized vehicles are typically equipped with a cruise control system for automatically maintaining the speed of a vehicle despite changes in the environment (e.g., wind speed, and direction) or the terrain (e.g., slope of the road). Cruise control systems are normally equipped with an interface system located on the steering column or steering wheel of the vehicle for allowing a driver to manually engage and disengage the cruise control system. Cruise control systems also normally include a brake release switch effective for allowing a driver to disengage the cruise control system by depressing the brake pedal.

Cruise control provides significant benefits, particularly when driving long distances on restricted access roadways, such as the United States Interstate Highway system. However, situations often arise when a reduction in speed is appropriate in order to avoid an accident, but the driver is unable to disengage the cruise control system due to incapacitation of the driver (e.g., seizure or heart attack), impairment of the driver (e.g., alcohol impairment), drowsiness of the driver, or the need for quick and immediate evasive action (e.g., avoidance of a deer, avoidance of road debris, fishtailing on ice or swerving caused by a flat tire). When such a situation is encountered, the cruise control continues to maintain the set speed of the vehicle despite the loss of control by the driver.

Accordingly, a substantial need exists for a cruise control safety release system capable of automatically disengaging the cruise control system of a vehicle when a driver has lost control or is about to lose control of the vehicle. It is also important for consumer acceptance that the cruise control safety release system does not result in a significant number of "false" disengagements (i.e., a normal operating condition incorrectly interpreted as a loss or impending loss of driver control, resulting in an unwanted and unnecessary disengagement of the cruise control system).

SUMMARY OF THE INVENTION

We have discovered a system for enhancing the safety of a cruise control system. The system, hereinafter referenced for convenience as the cruise control swerve release system, automatically disengages the cruise control system when the vehicle experiences a lateral acceleration (e.g., swerving, fishtailing or cornering at an excessive speed) indicative of a situation which would benefit from a reduction in the speed of the vehicle.

Generally, the cruise control swerve release system includes (i) a sensor mounted upon a motorized vehicle equipped with a cruise control system for sensing lateral acceleration of the vehicle, and (ii) a controller in communication with the sensor and the cruise control system for disengaging the cruise control system when the sensor detects a lateral acceleration in excess of a predetermined threshold value.

More specifically, the cruise control swerve release system includes (i) an accelerometer mounted upon the vehicle so as to sense lateral acceleration of the vehicle and generate a lateral acceleration signal having a value proportional to the sensed lateral acceleration, and (ii) a controller in electrical communication with the accelerometer and the cruise control system for disengaging the cruise control system upon receiving a lateral acceleration signal in excess of a predetermined threshold value.

The invention further includes a method for automatically disengaging the cruise control system on a motorized vehicle when the vehicle experiences a lateral acceleration in excess of a predetermined threshold value. The method includes (i) sensing lateral acceleration of the vehicle, and (ii) disengaging the cruise control system when the sensor detects a lateral acceleration in excess of a predetermined threshold value.

DETAILED DESCRIPTION OF THE INVENTION INCLUDING A BEST MODE

Nomenclature

100 Cruise Control Swerve Release System
101 Lateral Acceleration Sensor
102 Microcontroller
103 Swerve Release Switch
111 Pendulum
112 Cam
113 First Pair of Electrical Contacts
113a Proximal Contact of First Pair of Electrical Contacts
113b Distal Contact of First Pair of Electrical Contacts
114 Second Pair of Electrical Contacts
114a Proximal Contact of Second Pair of Electrical Contacts
114b Distal Contact of Second Pair of Electrical Contacts
115 Housing
116 Leaf Spring
117 Microswitch
121a First Mercury Switch
121b Second Mercury Switch
122 Mercury
123 Bulb
123d Distal End of Bulb
123p Proximal End of Bulb
124 First Pair of Electrical Contacts
125 Second Pair of Electrical Contacts
• Angle of Incline Relative to Gravity
200 Cruise Control Module
300 Brake Release Switch
301 Electrical Circuit for Brake Release Switch

Construction

The invention is a cruise control swerve release system 100 capable of automatically disengaging the cruise control system of a motorized vehicle when the vehicle experiences a lateral acceleration in excess of a predetermined threshold value. The system 100, hereinafter referenced for convenience as the cruise control swerve release system 100, can be effectively utilized with any motorized vehicle equipped with a cruise control system including passenger vehicles, light duty trucks (i.e., those equipped to carry one ton or less), heavy duty trucks (i.e., those equipped to carry more than one ton), and semis.

The threshold value should be set at a value which is high enough to avoid accidentally disengaging the cruise control system (not shown) under normal operating conditions but low enough to disengage the cruise control system when the lateral acceleration is indicative of an impending loss of control by the driver (not shown) unless the speed of the vehicle (not shown) is reduced. Situations where the cruise control swerve release system 100 should disengage the cruise control system include (i) swerving or high acceleration turns resulting from a driver's inability to control the vehicle due to the onset of a medical condition such a driver who has blacked-out or is experiencing a heart attack or seizure, (ii) swerving or high acceleration turns resulting from an evasive maneuver such as typically experienced when attempting to avoid a deer, road debris or another vehicle in the roadway, (iii) fishtailing on an icy road, (iv) swerving or high acceleration turns resulting from the erratic driving of an impaired driver, (v) swerving or high acceleration turns resulting from the erratic driving of a drowsy driver, and (vi) swerving caused by a flat tire.

Figure 2:
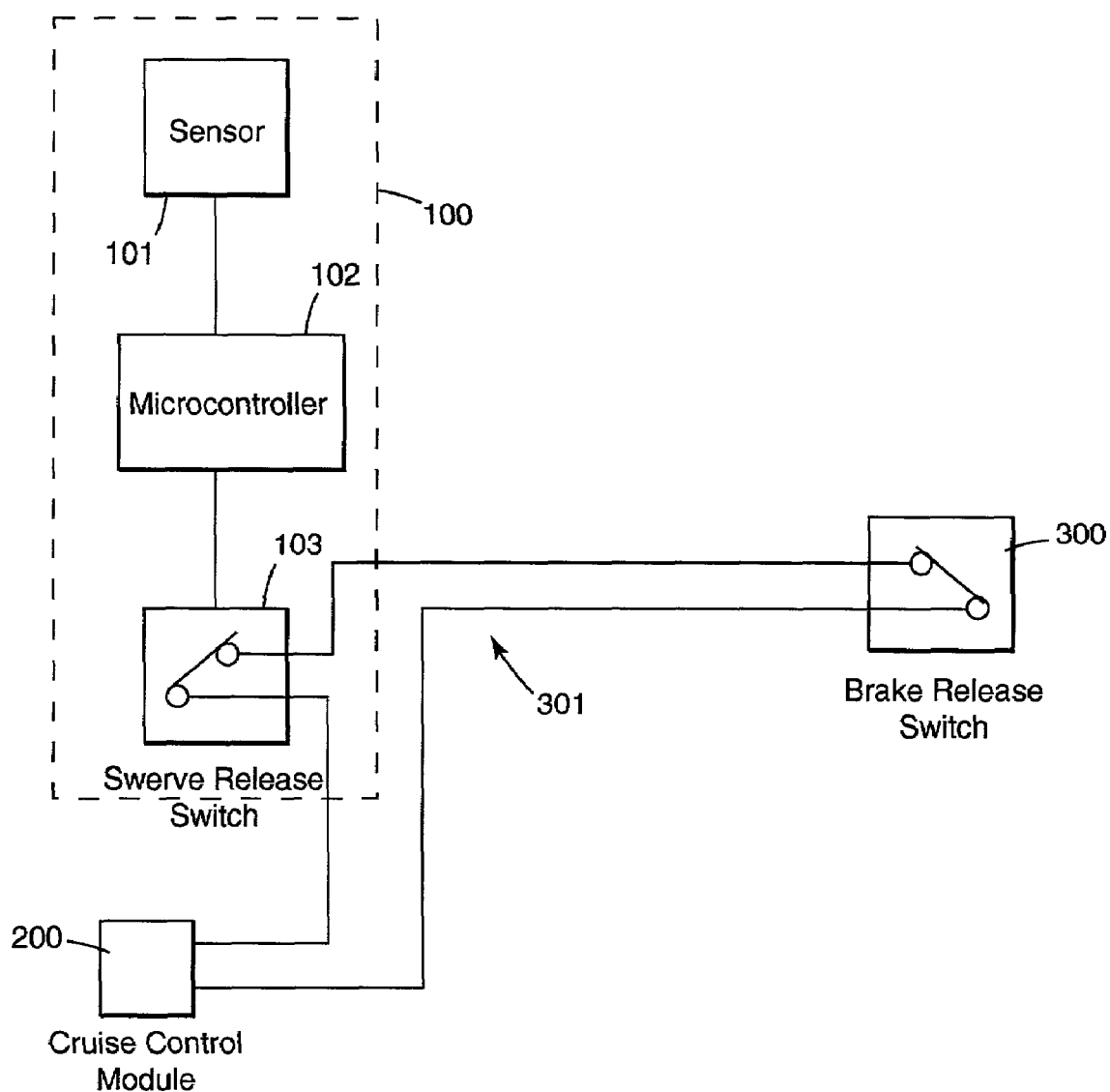
FIG. 2 is an electrical schematic of an embodiment of the invention.

As shown schematically in FIG. 2, one embodiment of the cruise control swerve release system 100 includes a sensor 101 for detecting and measuring lateral acceleration of a motorized vehicle and a switch 103 in communication with the sensor 101 and the cruise control module 200 for automatically disengaging the cruise control system when the sensor 101 detects a lateral acceleration in excess of a predetermined threshold value.

The cruise control swerve release system 100 can be operably connected to most standard cruise control systems without redesign of the cruise control system by positioning the swerve release switch 103 within the brake release electrical circuit 301. Such a connection allows the swerve release switch 103 to utilize existing wiring (not shown) and the existing cruise release pin (not shown) on a typical cruise control module 200 to effect disengagement of the cruise control system when the swerve release switch 103 is tripped.

As shown in FIG. 2, a microcontroller 102 can be utilized for receiving the electrical lateral acceleration signal from the lateral acceleration sensor 101, comparing the value of the lateral acceleration signal to the predetermined threshold value, and effecting disengagement of the cruise control system (not shown) when the lateral acceleration signal exceeds the predetermined threshold value.

When an electrical lateral acceleration sensor 101 is employed, such as an accelerometer, those electrical components typically employed to amplify and condition the signal may be employed in accordance with standard industry practice to ensure transmission and receipt of an accurate and appropriate signal from the lateral acceleration sensor 101 to the microcontroller 102.

Accelerometers can provide a signal that is proportional to the lateral acceleration of the motor vehicle. Any of the various known accelerometers can be utilized. These include sensors such as disclosed in U.S. Pat. No. 4,023,864 issued to Lang et al., U.S. Pat. No. 4,908,767 issued to Scholl et al., U.S. Pat. No. 5,063,782 issued to Kellett, U.S. Pat. No. 5,269,187 issued to Hanson, U.S. Pat. No. 5,369,580 issued to Monji et al., U.S. Pat. No. 5,473,930 issued to Gademann et al., U.S. Pat. No. 5,548,273 issued to Nicol et al., U.S. Pat. No. 5,742,918 and U.S. Pat. No. 5,742,919 issued to Ashrafi et al., U.S. Pat. No. 5,878,357 issued to Sivashankar et al., U.S. Pat. No. 6,130,608 issued to McKeown et al. the disclosures of which are incorporated by reference.

Suitable accelerometers are commercially available from a number of sources including Entran Devices, Inc. of Fairfield, N.J. and Digi-Key Corporation of Thief River Falls, Minn.

Figure 3:
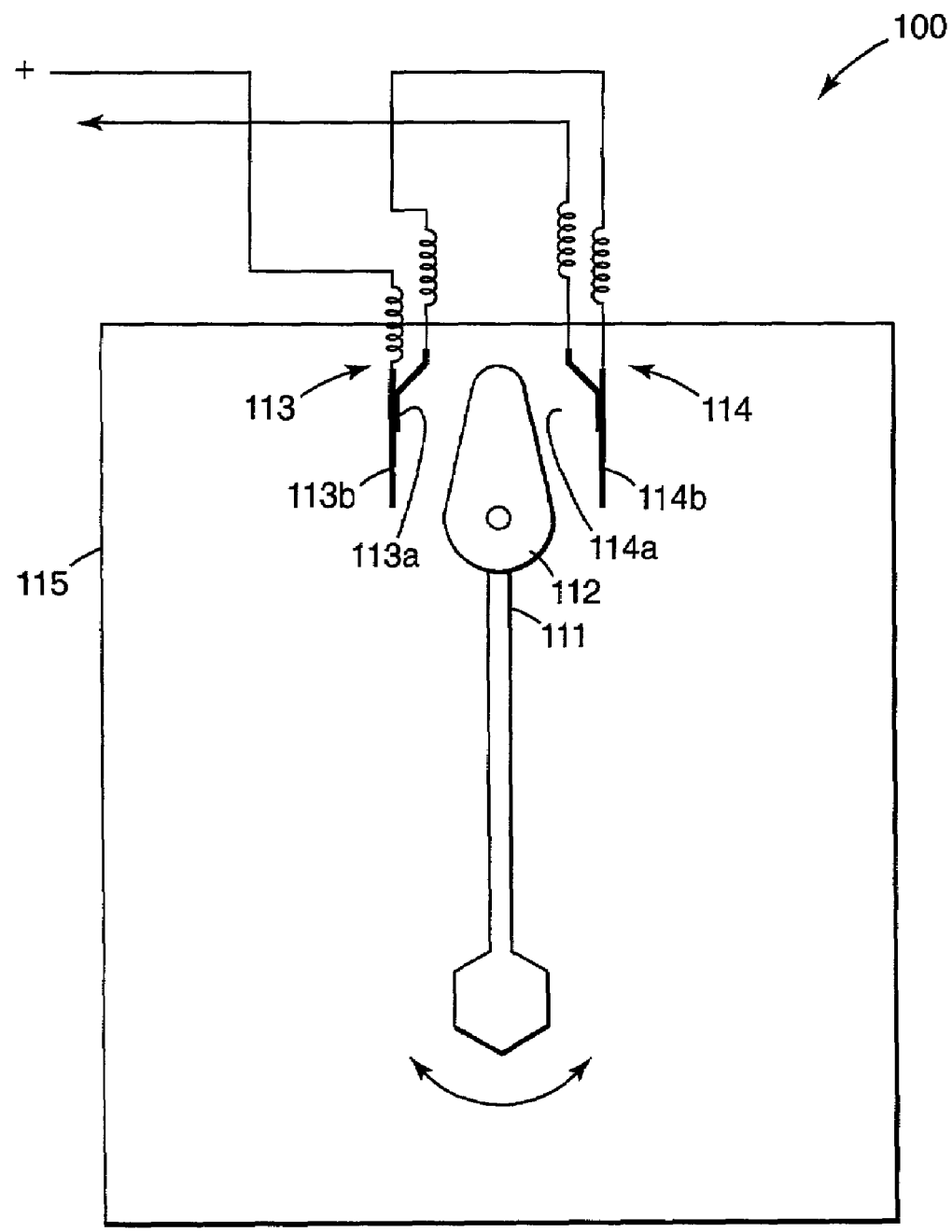
FIG. 3 is a front view of an embodiment of the invention.

As shown in FIG. 3, a simple mechanical system capable of automatically disengaging the cruise control system of a motorized vehicle when the vehicle experiences a lateral acceleration in excess of a predetermined threshold value includes a pendulum 111 attached to a rotatable cam 112, with the cam 112 positioned and arranged to engage and open a paired set of normally closed electrical contacts 113 and 114 positioned on either side of the cam 112. The mechanical cruise control swerve release system 100 is retained within a protective housing 115 and mounted upon the vehicle so that the pendulum 111 swings in proportion to the lateral acceleration experienced by the vehicle. The cam 112 is positioned relative to the normally closed electrical contacts 113 and 114 such that the cam 112 will deflect the distal contact 113b or 114b away from the associated proximal contact 113a or 114a respectively, thereby opening the paired electrical contacts 113 or 114 and disengaging the cruise control system whenever the pendulum 111 swings a sufficient distance to either side.

Figure 4A:
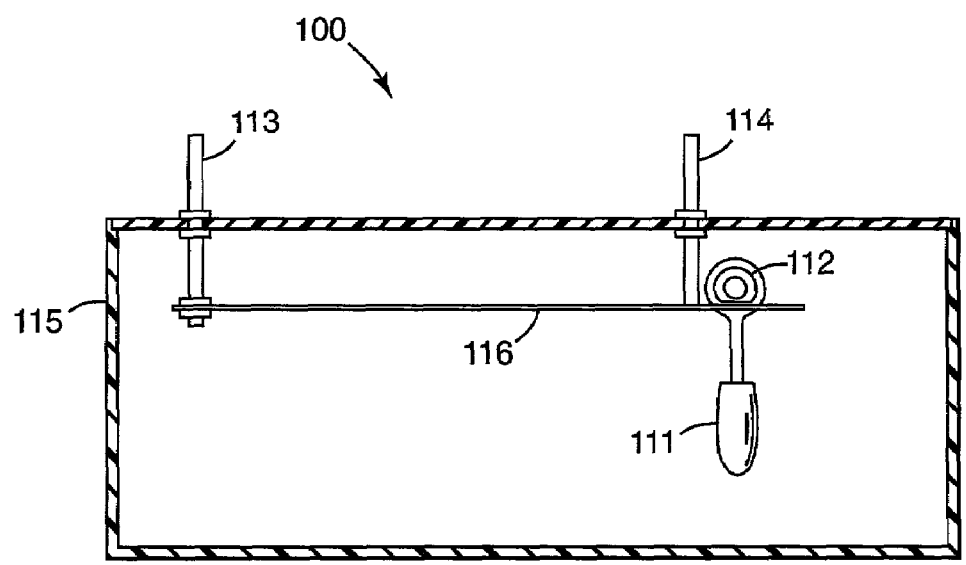
FIG. 4a is a front view of an embodiment of the invention in the absence of lateral acceleration.
Figure 4B:
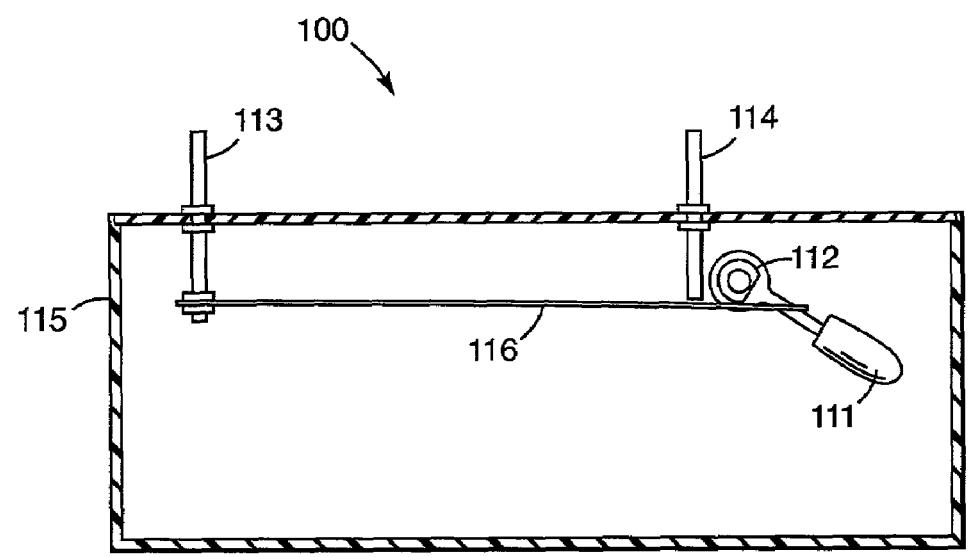
FIG. 4b is a front view of the embodiment of the invention shown in FIG. 4a subjected to lateral acceleration sufficient to open the normally closed switch.

A second mechanical system capable of automatically disengaging the cruise control system of a motorized vehicle when the vehicle experiences a lateral acceleration in excess of a predetermined threshold value is shown in FIGS. 4a and 4b. The system shown in FIGS. 4a and 4b includes a pendulum 111 attached to a rotatable cam 112. The cam 112 is positioned and arranged to engage and deflect a leaf spring 116 when the pendulum 111 swings a sufficient distance to either side. The leaf spring 116 is fixedly attached and in electrical communication with a first electrical contact 113, and biased into electrical contact with a second electrical contact 114. The mechanical cruise control swerve release system 100 is retained within a protective housing 115 and mounted upon the vehicle so that the pendulum 111 swings in proportion to the lateral acceleration experienced by the vehicle. The cam 112 is positioned relative to the normally closed electrical contacts 113 and 114 such that the cam 112 will deflect the leaf spring 116 away from the second electrical contact 114 so as to open the electrical circuit and disengaging the cruise control system whenever the pendulum 111 swings a sufficient distance to either side.

Figure 5A:
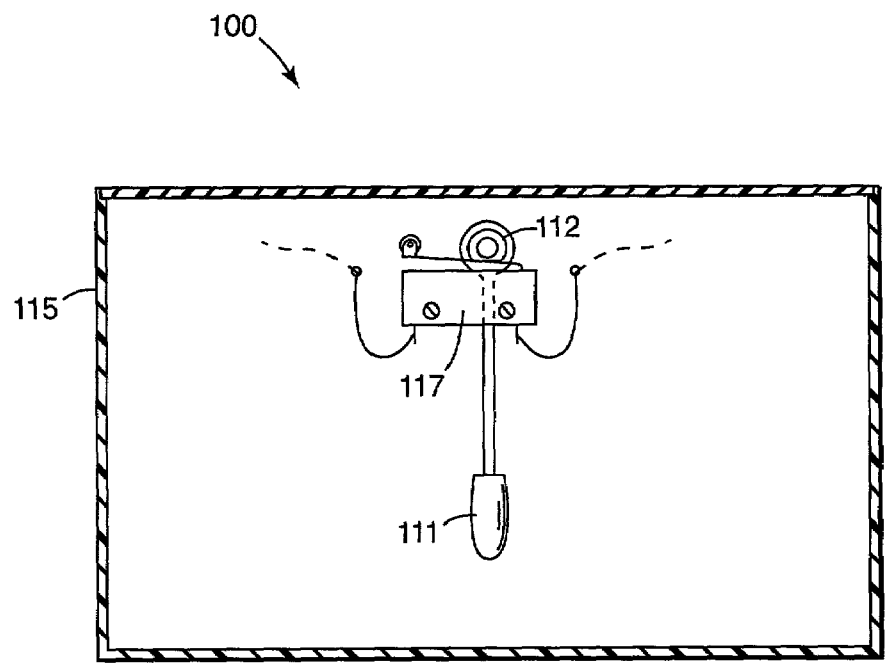
FIG. 5a is a front view of an embodiment of the invention in the absence of lateral acceleration.
Figure 5B:
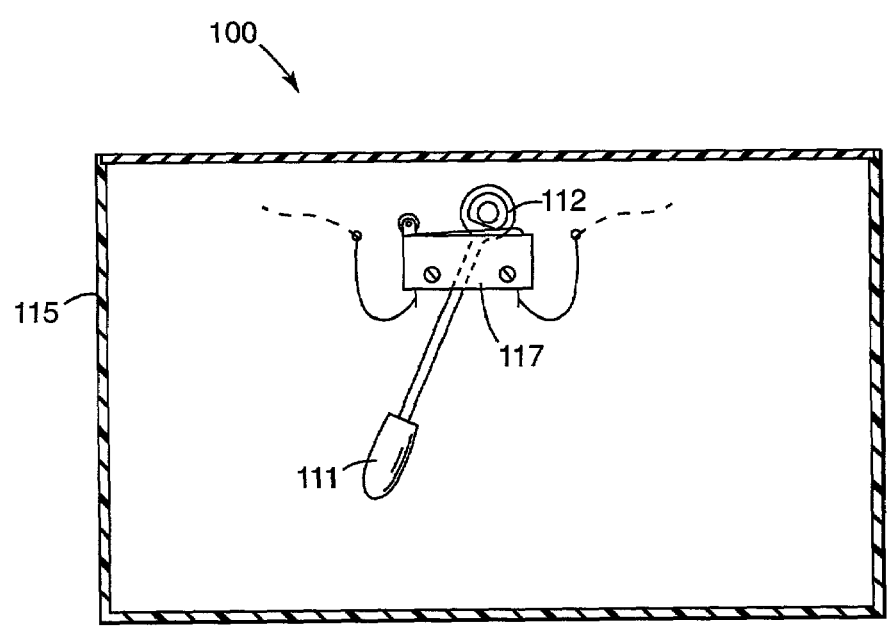
FIG. 5b is a front view of the embodiment of the invention shown in FIG. 4a subjected to lateral acceleration sufficient to open the normally closed switch.

A third mechanical system capable of automatically disengaging the cruise control system of a motorized vehicle when the vehicle experiences a lateral acceleration in excess of a predetermined threshold value is shown in FIGS. 5a and 5b. The system shown in FIGS. 5a and 5b includes a pendulum 111 attached to a rotatable cam 112. The cam 112 is positioned and arranged to engage and open a normally closed standard microswitch 117 when the pendulum 111 swings a sufficient distance to either side. The mechanical cruise control swerve release system 100 is retained within a protective housing 115 and mounted upon the vehicle so that the pendulum 111 swings in proportion to the lateral acceleration experienced by the vehicle. The cam 112 is positioned relative to the normally closed microswitch 117 such that the cam 112 will engage and open the microswitch 117, and thereby disengage the cruise control system, whenever the pendulum 111 swings a sufficient distance to either side.

Figure 6:
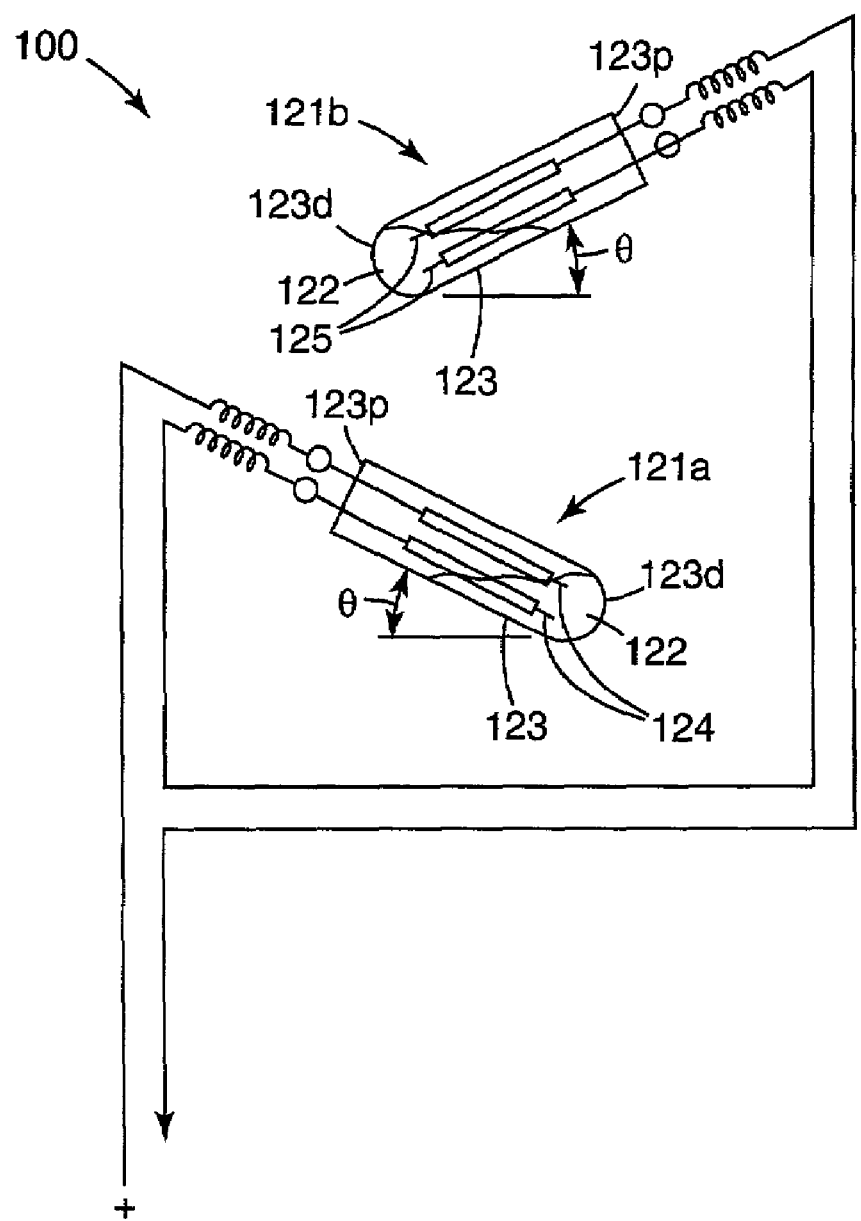
FIG. 6 is a front view of an embodiment of the invention.

As shown in FIG. 6, another suitable mechanical system capable of automatically disengaging the cruise control system of a motorized vehicle when the vehicle experiences a lateral acceleration in excess of a predetermined threshold value employs a pair of inclined mercury switches 121*a* and 121*b* such as disclosed in U.S. Pat. No. 4,213,116 issued to Holtzman, the disclosure of which is incorporated by reference. The mercury switches 121*a* and 121*b* are mounted upon the vehicle so that lateral acceleration of the vehicle causes the mercury 122 within one of the bulbs 123 to ascend towards the proximal end 123*p* of the bulb and away from the electrical contacts 124 or 125. The bulbs 123 are positioned as mirror images so that one switch 121*a* is operable when the lateral acceleration is to the left and the other switch 121*b* is operable when the lateral acceleration is to right. The bulb 123 for each switch 121*a* and 121*b* is inclined at an angle • effective for allowing the mercury 122 contained within the bulb 123 to ascend and lose contact with the exposed end of at least one of the electrical contacts 124 or 125 positioned near the distal end 123*d* of the bulb 123, thereby opening the switch 121*a* or 121*b*, only when the lateral acceleration exceeds the predetermined lateral acceleration threshold value.

As can be appreciated from this disclosure, a wide variety of electrical and mechanical switches can be used in the cruise control swerve release system 100 of the invention so long as the switch is able to withstand the harsh environmental (e.g., temperature extremes) and use conditions (e.g., continuous vibration and exposure to water, salt, mud and grime) to which the switch will be exposed. The cruise control swerve release system 100 of the invention can be constructed to utilize a normally open or normally closed switch as desired.

Lateral acceleration may alternatively be calculated from measurements of steering angle and vehicle speed as set forth in U.S. Pat. No. 5,276,624 issued to Ito et al., U.S. Pat. No. 5,369,580 issued to Monji et al., U.S. Pat. No. 5,878,357 issued to Sivashankar et al. the disclosures of which are incorporated by reference.

Use

Figure 1:
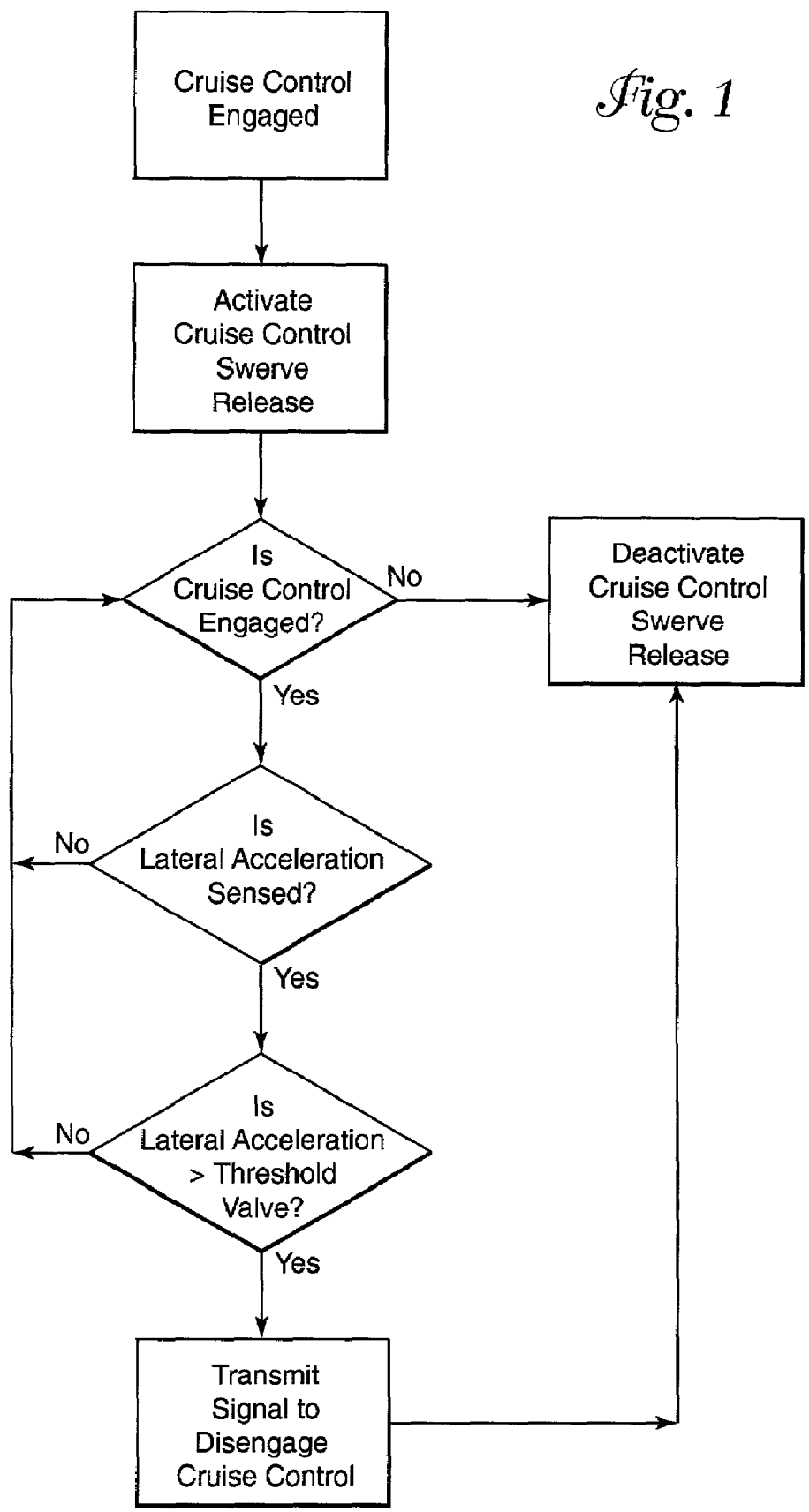
FIG. 1 is a flowchart for an embodiment of the invention.

The cruise control swerve release system 100 of the invention is effective for automatically disengaging the cruise control whenever the vehicle experiences a lateral acceleration indicating an actual or potential loss of control by the driver and a need to reduce the speed of the vehicle. Referring to FIG. 1, the cruise control swerve release system 100 is automatically activated when the cruise control is engaged. In the event, the cruise control is disengaged, such as by depressing the brake so as to trigger the cruise control brake release switch 300, the cruise control swerve release system 100 is no longer necessary and will resume functioning again when the cruise control is engaged. The cruise control swerve release system 100 can optionally remain activated although the cruise control is not engaged, but the cruise control swerve release system 100 will have no operational effect upon the cruise control system until the cruise control system is engaged.

While the cruise control swerve release system 100 is activated, lateral acceleration is sensed, measured and compared, either mechanically or electronically, to a threshold value. When the sensed lateral acceleration exceeds the threshold value, the cruise control is automatically disengaged and the vehicle allowed to slow.

While preferred embodiments of the invention have been described, it should be understood that various changes, adaptations and modifications may be made to the invention without departing from the spirit of the invention and the scope of the appended claims.

We claim:

1. A system for automatically disengaging a cruise control system on a motorized vehicle when the vehicle experiences a lateral acceleration in excess of a predetermined threshold value, comprising:
   (a) a sensor mounted upon the vehicle for sensing lateral acceleration of the vehicle; and
   (b) a controller in direct communication with the sensor and the cruise control system for disengaging the cruise control system when the sensor detects a lateral acceleration in excess of a predetermined threshold value.

2. The system of claim 1 wherein the motorized vehicle is a passenger vehicle.

3. The system of claim 1 wherein the motorized vehicle is a light duty truck.

4. The system of claim 1 wherein the motorized vehicle is a heavy duty truck.

5. The system of claim 1 wherein the motorized vehicle is a semi truck.

6. The system of claim 1 wherein the sensor is an accelerometer.

7. The system of claim 6 wherein (i) the accelerometer is effective for generating an electrical lateral acceleration signal which is proportional to lateral acceleration experienced by the vehicle, and (ii) the controller is a microcontroller in electrical communication with the accelerometer and the cruise control system effective for (A) receiving the electrical lateral acceleration signal from the accelerometer, (B) comparing the value of the lateral acceleration signal to the predetermined threshold value, and (C) effecting disengagement of the cruise control system when the lateral acceleration signal exceeds the predetermined threshold value.

8. The system of claim 1 wherein the sensor is a pendulum.

9. The system of claim 8 wherein the controller is a mechanical switch.

10. The system of claim 1 wherein the controller is a mechanical switch.

11. A safety system for a motorized vehicle equipped with a cruise control system, comprising:
    (a) an accelerometer mounted upon the vehicle so as to sense lateral acceleration of the vehicle and generate a lateral acceleration signal having a value proportional to the sensed lateral acceleration; and
    (b) a controller in direct electrical communication with the accelerometer and the cruise control system for disengaging the cruise control system upon receiving a lateral acceleration signal in excess of a predetermined threshold value.

12. The system of claim 11 wherein the motorized vehicle is a passenger vehicle.

13. The system of claim 11 wherein the motorized vehicle is a light duty truck.

14. The system of claim 11 wherein the motorized vehicle is a heavy duty truck.

15. The system of claim 11 wherein the motorized vehicle is a semi truck.

16. The system of claim 11 wherein the controller is a microcontroller.

17. A method for automatically disengaging a cruise control system on a motorized vehicle when the vehicle experiences a lateral acceleration in excess of a predetermined threshold value, comprising
   (a) sensing lateral acceleration of the vehicle; and
   (b) automatically and directly disengaging the cruise control system when the sensor detects a lateral acceleration in excess of a predetermined threshold value.

* * * * *